(12) United States Patent
Schoettle et al.

(10) Patent No.: US 6,745,968 B1
(45) Date of Patent: Jun. 8, 2004

(54) SINGLE-REEL CARTRIDGE FOR DATA PROCESSING HAVING A MULTI-PART BRAKING SYSTEM

(75) Inventors: Klaus Schoettle, Strasbourg (FR); Matthias Kuenstner, Ohlsbach (DE); Edgar Hummel, Kehl (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 10/019,538

(22) PCT Filed: Jun. 30, 2000

(86) PCT No.: PCT/EP00/06157
§ 371 (c)(1),
(2), (4) Date: Mar. 20, 2002

(87) PCT Pub. No.: WO01/03137
PCT Pub. Date: Jan. 11, 2001

(30) Foreign Application Priority Data

Jul. 3, 1999 (DE) .......................................... 199 30 802

(51) Int. Cl.[7] .............................................. G11B 23/04
(52) U.S. Cl. ................................ 242/338.1; 242/345.2; 242/348
(58) Field of Search .............................. 242/338, 338.1, 242/343, 343.1, 343.2, 348, 345.2; 360/132

(56) References Cited

U.S. PATENT DOCUMENTS

| | | | |
|---|---|---|---|
| 5,893,527 A | * 4/1999 | Mizutani et al. ............ | 242/348 |
| 5,901,916 A | 5/1999 | McAllister et al. | |
| 6,154,342 A | * 11/2000 | Vanderheyden et al. .... | 360/132 |
| 6,264,126 B1 | * 7/2001 | Shima et al. ................ | 242/343 |
| 6,411,466 B1 | * 6/2002 | Shima et al. ................ | 360/132 |
| 6,452,748 B1 | * 9/2002 | Shima et al. ................ | 360/132 |
| 6,462,905 B1 | * 10/2002 | Takahashi et al. .......... | 360/132 |
| 6,480,357 B1 | * 11/2002 | Rambosek .................. | 360/132 |
| 6,499,686 B2 | * 12/2002 | Tsuyuki et al. ............. | 242/348 |
| 6,568,619 B1 | * 5/2003 | Shiga et al. ................. | 242/348 |

FOREIGN PATENT DOCUMENTS

| | | |
|---|---|---|
| EP | 0284687 | 10/1988 |
| EP | 0926676 | 6/1999 |

* cited by examiner

Primary Examiner—William A. Rivera
(74) Attorney, Agent, or Firm—Greenblum & Bernstein, P.L.C.

(57) ABSTRACT

Magnetic-tape cartridge includes a substantially rectangular housing. At least one tape reel is rotatably mounted in the housing. The at least one tape reel is configured to receive wound magnetic tape. A first part is axially movably mounted in a center of the at least one tape reel. A second part is non-rotatably mounted and axially movably mounted to a housing wall of the cartridge via a spring. The first part is movable between a resting position and an operating position in which the first part moves the second part against the biasing force of the spring. The second part is movable between a first position, thereby preventing the at least one tape reel from rotating, to a second position thereby allowing rotation of the at least one tape reel

9 Claims, 5 Drawing Sheets

SINGLE-REEL CARTRIDGE FOR DATA PROCESSING HAVING A MULTI-PART BRAKING SYSTEM

CROSS-REFERENCE TO RELATED APPLICATIONS

The present application is a National Stage Application of International Application No. PCT/EP00/06157, filed Jul. 4, 2001. Further, the present application claims priority under 35 U.S.C. § 119 of German Patent Application No. 199 30 802.0 filed on Jul. 3, 1999.

BACKGROUND OF THE INVENTION

1. Field of the Invention

The invention relates to a cartridge for magnetic recording media in tape form, preferably a single-reel cartridge for data tapes having a multi-part braking system.

2. Discussion of Background Information

Cartridges of this type comprise at least a housing which, with the exception of one corner, is of an angular design. The housing has two housing parts with bottom, top and side walls and the housing parts are welded or screwed to one another. A tape reel is provided which uses a hub. Protruding from the ends of the hub are radial upper and lower flanges. The hub base has the driving and braking serration, and a magnetic tape (not shown) is wound up on the hub. Provided at the free end of the hub is a guide element. With the aid of the guide element, the magnetic tape is led to the winding-up reel and wound up on the latter. A reel brake is also included, which is connected on its upper side via connecting elements to the housing top wall in an axially displaceable manner. However, it is secured against twisting and radial positional changes. The serration engages in the braking serration of the tape reel and thus also secures the tape reel against twisting and, by the action of the spring, simultaneously presses against the lower housing part when the driving hub of the equipment is not in engagement.

Figure 1:
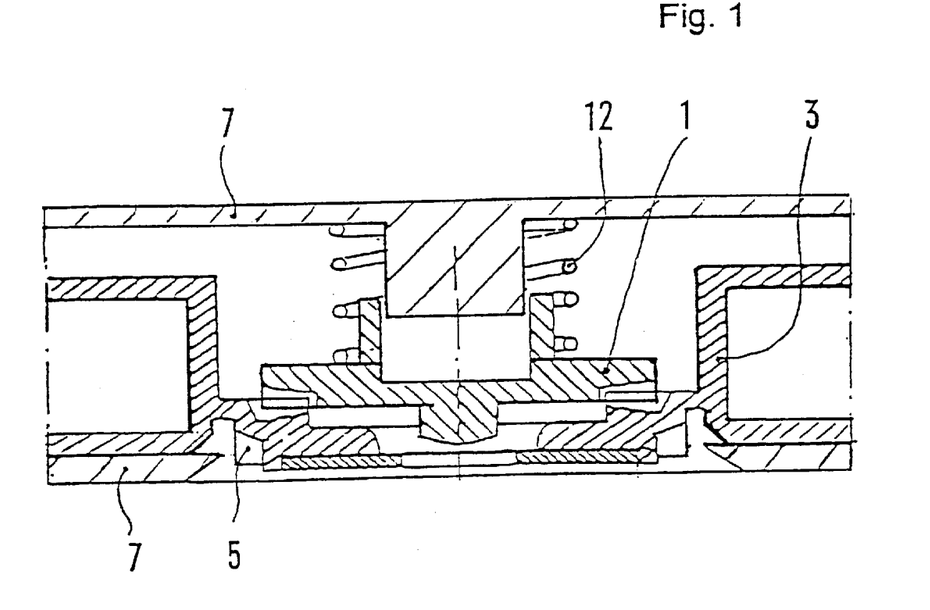
FIG. 1 shows a cross section through a conventional reel brake which is located in the rest position in a cartridge outside the equipment.
Figure 2:
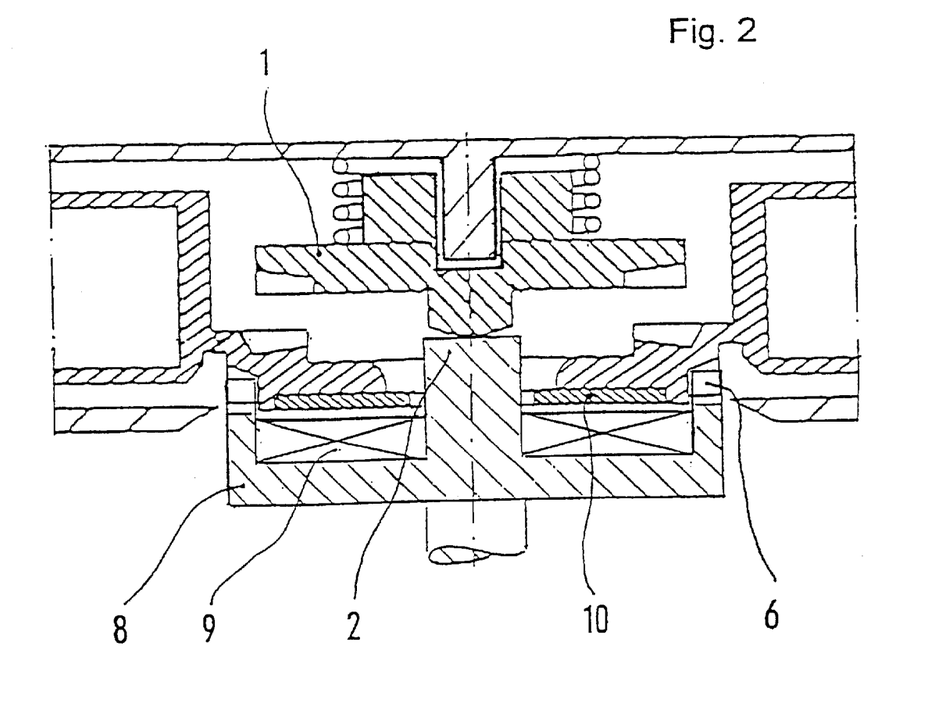
FIG. 2 shows a cross section through a conventional reel brake which is located in the operating position in a cartridge inside the equipment, the sectional representation having been turned through 90° with respect to FIG. 1.

The reel brake 1, which is generally conventional in the case of single-reel cartridges, is released directly, as shown in FIG. 1 and FIG. 2, on the equipment side by a pin 2 having a wear-resistant surface. Since the surface of this pin 2 protrudes somewhat above the plane of the serration 6 of the driving hub or the winding pin 8, the reel brake 1 is initially lifted against the force of the spring 12 by the winding pin 8 during loading of the cartridge into the drive unit. Only thereafter does the force acting between the magnet 9 on the equipment side and the metal plate 10 recessed into the hub base of the tape reel 3 cause the serration 6 of the winding pin 8 to engage in the driving serration 5 of the tape reel 3 and cause the tape reel 3 to be lifted from the lower wall of the housing 7 out of its first position, (i.e., the rest position shown in FIG. 1), into its second position, (i.e., the operating position), which is shown in FIG. 2.

EP 0 284 687 A describes a single-reel cartridge with improved centering of the reel brake relative to the tape reel. The ribs or projections are mounted about the cylindrical inner circumference of the tape reel hub, on which the exterior diameter of the disk-shaped center of the reel brake is guided, both when assembling the cartridge and when easing the reel brake during operation.

This type of braking system has, among other disadvantages, the disadvantage that both the required travel for releasing the reel brake and the travel for lifting the tape reel out of its first position into its second position are added to each other and consequently restrict the lower limit of the cassette height and overall equipment height.

EP 0 926 676 A describes a single-reel cartridge with two-part braking system, with the first part of the braking system being operated by the equipment-side driving hub, and having on the circumference of its disk-shaped central portion an annular protrusion pointing in the direction of equipment-side driving hub, which protrusion extends into a circular groove located in the area of the tape reel hub opening, and with the circumferential circular protrusion overlapping the circumferential circular groove even with the travel of the braking system necessary to release the reel brake, and with the cartridge thus being protected from dust and dirt entering through the reel hub opening.

However, technical development has for some time required cartridges with an every greater storage density and at the same time every smaller outer housing dimensions.

Figure 3:
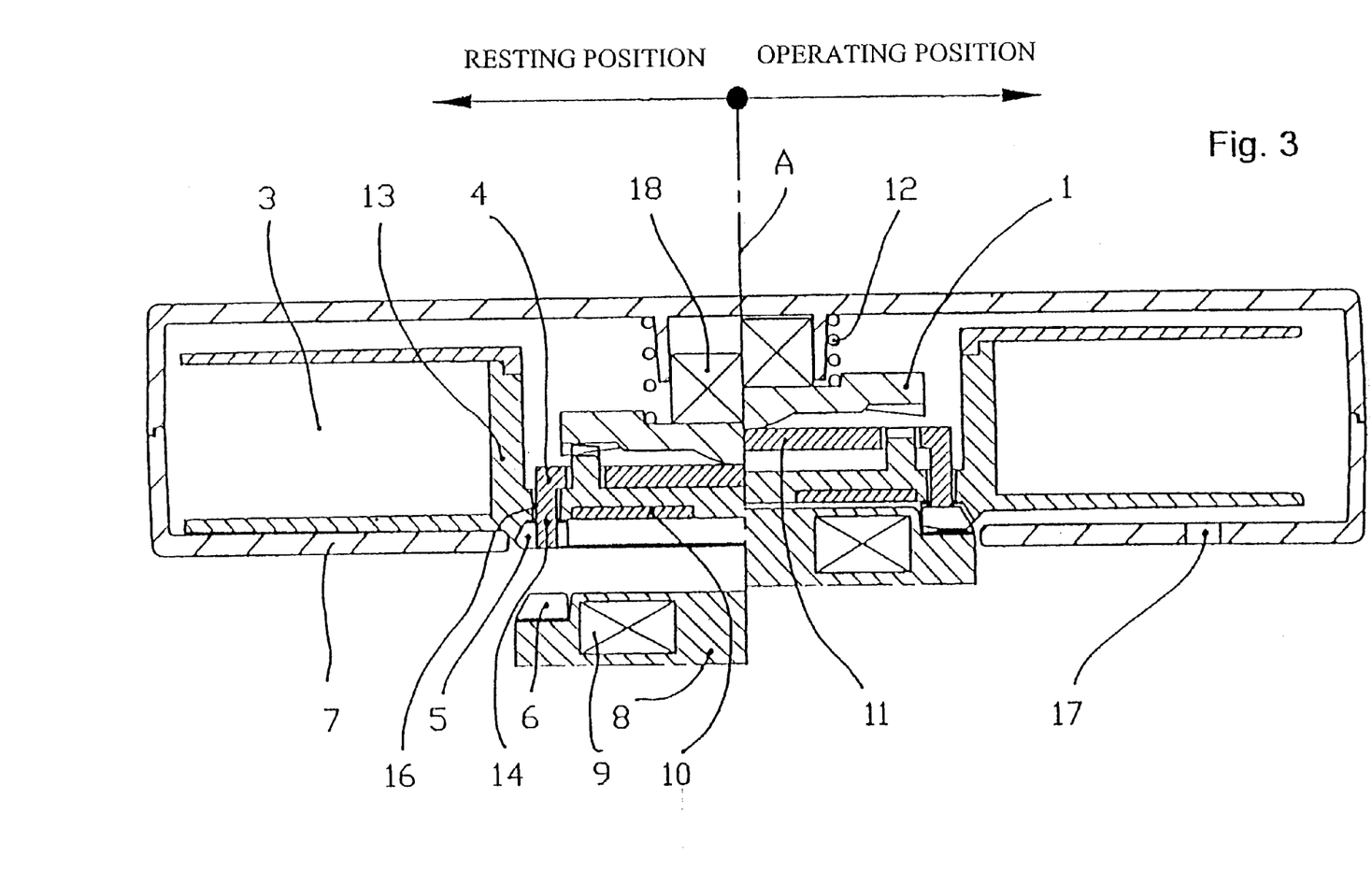
FIG. 3 shows a cross section through a conventional single-reel cartridge having a two-part braking system in the rest position and operating position.

A braking system which meets this requirement is conventionally known. This system is represented in FIG. 3 and proposes a two-part braking system, the first element corresponding to the conventional reel brake 1 and the second element representing a driver disk 4. The driver disk 4 includes a thin plate 11, which is axially displaceable within the hub 13 and has three feet 14 which are evenly distributed around the circumference and protrude through the hub base of the tape reel 3, through clearances 16 in the region of the driving serration 5. The releasing of the reel brake 1 from the tape reel 3 in the operating position (i.e., the second position) thus takes place by means of this driver disk 4, which is lifted to the same extent in the tape reel as the serration 6 of the driving hub 8 engaging into the driving serration 5 of the tape reel 3 when the forces of the magnet 9 act on the metal plate 10 fastened in the tape reel 3.

A disadvantage of this arrangement is that it only functions satisfactorily if the tolerances between the driver disk 4 and clearances 16 of the tape reel 3 are adequate in the corresponding regions. This results in both radial and tangential backlash and consequently in moveability or movement between the driver disk 4 and tape reel 3.

Since the tape reel 3 constantly undergoes changes of direction and accelerations during operation, forces of inertia act on the driver disk 4, making the driver disk 4 run eccentrically within the tolerances in the tape reel 3.

To be regarded as another disadvantage of the known cartridges is the configuration of the contact surfaces between the reel brake 1 and driver disk 4. Adequately precise concentric running of the tape reel 3 can be achieved only if the reference receiving openings 17 for positional fixing of the cartridge in the equipment and the centering on axis A of the tape reel 3 with respect to the centering of the reel brake 1 lie within relatively small tolerances. For example, it is possible that, owing to the radial moveability or movement of the driver disk 4 within the tape reel 3, the contact surface of the reel brake 1 can over time work into the surface of the driver disk 4 at various points, which may be further exacerbated by differences in the positional fixing when playing back the magnetic-tape cartridge on different equipment. This may result in eccentric centerings between the reel brake 1 and driver disk 4, which bring about undesired radial movement of one or both parts 1 and 4 in their guides during each revolution.

A further disadvantage of conventional braking systems is the fact that the reel brake 1 has a tendency to undergo wobbling movements if runout errors of the tape reel 3, caused by tolerances originating both from the equipment and from the tape reel itself, coincide with correspondingly great backlash in the elements of the twist-preventing means of the reel brake 1.

Furthermore, during the transfer of the force of the spring 12 by the reel brake 1 to the feet 14 arranged on the outer circumference of the plate 11, the thin plate 11 of the driver disk 4 can bend and thus reduce the brake lifting-out path.

As a consequence of this, running noises and abrasion occur at the driving serration 6 and/or driver disk 4 and/or cartridge housing 7.

Abrasion generally produces dropouts on the recording medium in tape form. Abrasion at the driver disk 4 and at the serration 5 causes dimensional changes at the parts concerned and, in an extreme form, may reduce the brake lifting-out path and consequently make the cartridge unable to function.

Since both running noises and abrasion cannot be accepted for high-quality digital data storage systems, the object was to improve the braking system in such a way that the disadvantages described above, such as restricted functional reliability and running noises, due to impermissible moveability of the cassette components, and a high dropout rate due to abrasion, are eliminated.

The invention therefore provides a magnetic-tape cartridge which includes a substantially rectangular housing, at least one tape reel which is rotatably mounted therein and on which magnetic tape is wound up, and a multi-part braking system, at least one part being mounted in the center of the tape reel and at least a second part being spring-mounted on a housing wall, in each case in a torsionally secure and axially displaceable manner, and a first part, on the equipment side, being lifted from a rest position into an operating position and thus releasing a second part against the action of the force of the spring, out of its positive connection with the tape reel, and at least one part having flexible mechanisms, by which it is releasably fixed, at least in the operating position, on corresponding guiding mechanisms of the tape reel and/or of the cartridge housing.

The invention provides for a magnetic-tape cartridge, comprising a substantially rectangular housing, at least one tape reel which is rotatably mounted therein and on which magnetic tape is wound up, and a multi-part braking system, at least one part being mounted in the center of the tape reel and at least a second part being spring-mounted on a housing wall, in each case in a torsionally secure and axially displaceable manner, and a first part, on the equipment side, being lifted from a rest position into an operating position and thus releasing a second part against the action of the force of the spring, out of its positive connection with the tape reel, wherein at least one part has a flexible mechanism, by which it is releasably fixed, at least in the operating position, on corresponding guiding mechanisms of the tape reel and/or of the cartridge housing.

The first part may be designed as a driver disk, comprising a circular central plate, the cross section of which is preferably of a conical design and the upper side of the plate is rounded off in the central region, which forms the contact surface with respect to the reel brake, and a plurality of, preferably three, feet evenly distributed over the circumference of the central plate and extending in the axial direction. The second part may be designed as a reel brake, the face lying opposite the driver disk being planar, at least in the region of the contact surface. Preferably on the upper outer edge of the reel brake there are arranged regularly distributed or continuous, thin-walled flexible elements, which in the upper end position of the reel brake come to bear against a preferably peripheral rib of the upper housing part. The feet are of a T-shaped design and are preferably connected centrally to the central plate by way of radial connecting elements. The connecting elements may have a cross-sectional reduction. The T-bars of the feet of the driver disk may have planar guiding mechanisms, which preferably at the ends run in opposite senses with respect to one another, preferably obliquely toward the center axis, and are guided in a sliding manner on correspondingly beveled guiding mechanisms of the tape reel. The reel brake and/or the driver disk include a wear-resistant plastic. The wear-resistant plastic at least of one part may be mixed with at least one friction-reducing additive. The sum of the frictional forces, caused by the flexible fixing, between the braking parts, the guiding mechanisms of the tape reel and driver disk, the ribs and the guides, the flexible spring element and the peripheral housing rib of the braking part or cartridge housing may be less than the minimum force of the spring acting on the braking part.

The invention also provides for a magnetic-tape cartridge that includes a substantially rectangular housing. At least one tape reel is rotatably mounted in the housing. The at least one tape reel is configured to receive wound magnetic tape. A first part is axially movably mounted in a center of the at least one tape reel. A second part is non-rotatably mounted and axially movably mounted to a housing wall of the cartridge via a spring. The first part is movable between a resting position and an operating position in which the first part moves the second part against the biasing force of the spring. The second part is movable between a first position, thereby preventing the at least one tape reel from rotating, to a second position thereby allowing rotation of the at least one tape reel.

The second part may comprise a flexible mechanism. The first part may comprise a flexible mechanism. The at least one tape reel may comprise one of guiding surfaces and guiding mechanisms which cooperate with the flexible mechanism. The at least one tape reel may comprise one of guiding surfaces and guiding mechanisms. The first part may comprise a driver disk that includes a circular central plate and a contact surface. The circular central plate may have a conical surface. The contact surface may be one of curved or rounded. The driver disk may include a plurality of feet which are evenly distributed over a circumference of the circular central plate, wherein the feet extend in an axial direction. The second part may comprise a reel brake and a contact surface. The reel brake may comprise a planar face which is engagable with the first part. The reel brake may comprise at least one thin-walled flexible element. The at least one thin-walled flexible element may be engagable with a peripheral rib projecting from the housing wall of the cartridge. The driver disk may include a plurality of feet which are evenly distributed over a circumference of the circular central plate, wherein the feet extend in an axial direction and are T-shaped. The feet may be connected centrally to the circular central plate by radial connecting elements. The connecting elements may comprise a cross-sectional reduction. The feet may comprise T-bars. The T-bars may comprise one of planar guiding mechanisms and planar guiding surfaces. The planar guiding mechanisms or surfaces may be angled obliquely toward a center axis. The at least one tape reel may comprise one of planar guiding mechanisms and planar guiding surfaces which engage the T-bars. The at least one of the first part and the second part may comprise a wear-resistant plastic. Each of the first part and the second part may comprise a wear-resistant plastic. The wear-resistant plastic may comprise a mixture which includes at least one friction-reducing additive.

The invention also provides for a magnetic-tape cartridge comprising a housing. At least one tape reel is rotatably mounted in the housing. The at least one tape reel comprises a braking serration and is configured to receive wound magnetic tape. A driver mechanism is axially movably mounted. A reel brake comprises a braking serration and is non-rotatably and axially movably mounted within the housing via a biasing mechanism. The driver mechanism is movable between a resting position, in which the braking serration of the reel brake is allowed to engage the braking serration of the at least one tape reel, and an operating position, in which the driver disk moves the reel brake against the biasing force of the biasing mechanism and thereby dis-engages the braking serration of reel brake from the braking serration of the at least one tape reel.

The invention also provides for a magnetic-tape cartridge comprising a housing. At least one tape reel is rotatably mounted in the housing. The at least one tape reel comprises a braking serration and recesses, and is configured to receive a wound magnetic tape. A driver mechanism comprises radially oriented extensions and is axially movably mounted within the at least one tape reel. The radially oriented extensions are movably disposed in the recesses and each having an axially oriented part. A reel brake comprises a braking serration and is non-rotatably and axially movably mounted inside the cartridge via a biasing mechanism. The driver mechanism is movable between a resting position, in which the braking serration of the reel brake is allowed to engage the braking serration of the at least one tape reel, and an operating position, in which the driver disk moves the reel brake against the biasing force of the biasing mechanism and thereby dis-engages the braking serration of reel brake from the braking serration of the at least one tape reel.

BRIEF DESCRIPTION OF THE DRAWINGS

The invention is now explained in more detail with reference to the drawings, in which.

DETAILED DESCRIPTION OF THE INVENTION

Figure 4:
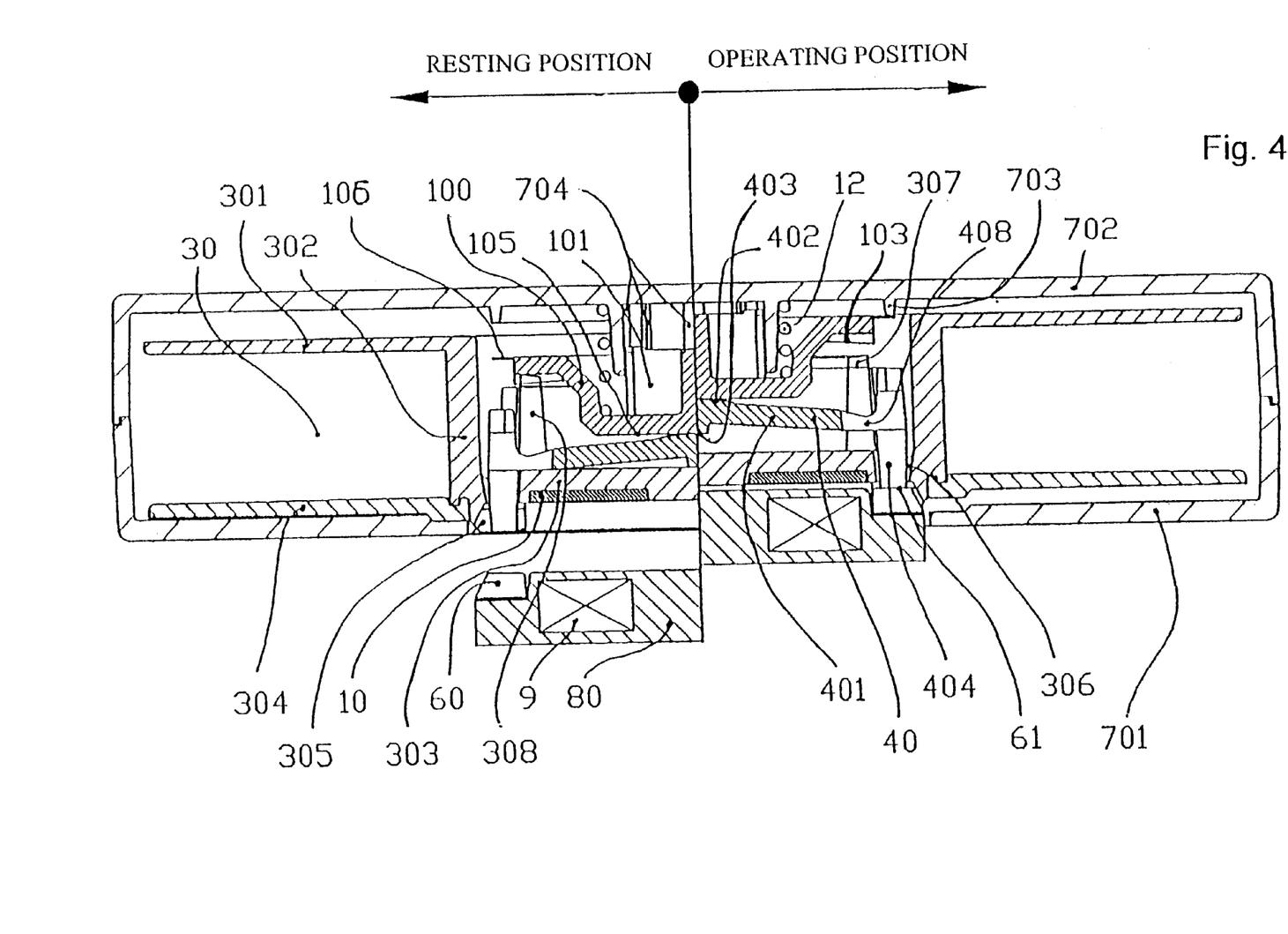
FIG. 4 shows a cross section through a two-part braking system according to the invention in the rest position and operating position.
Figure 5:
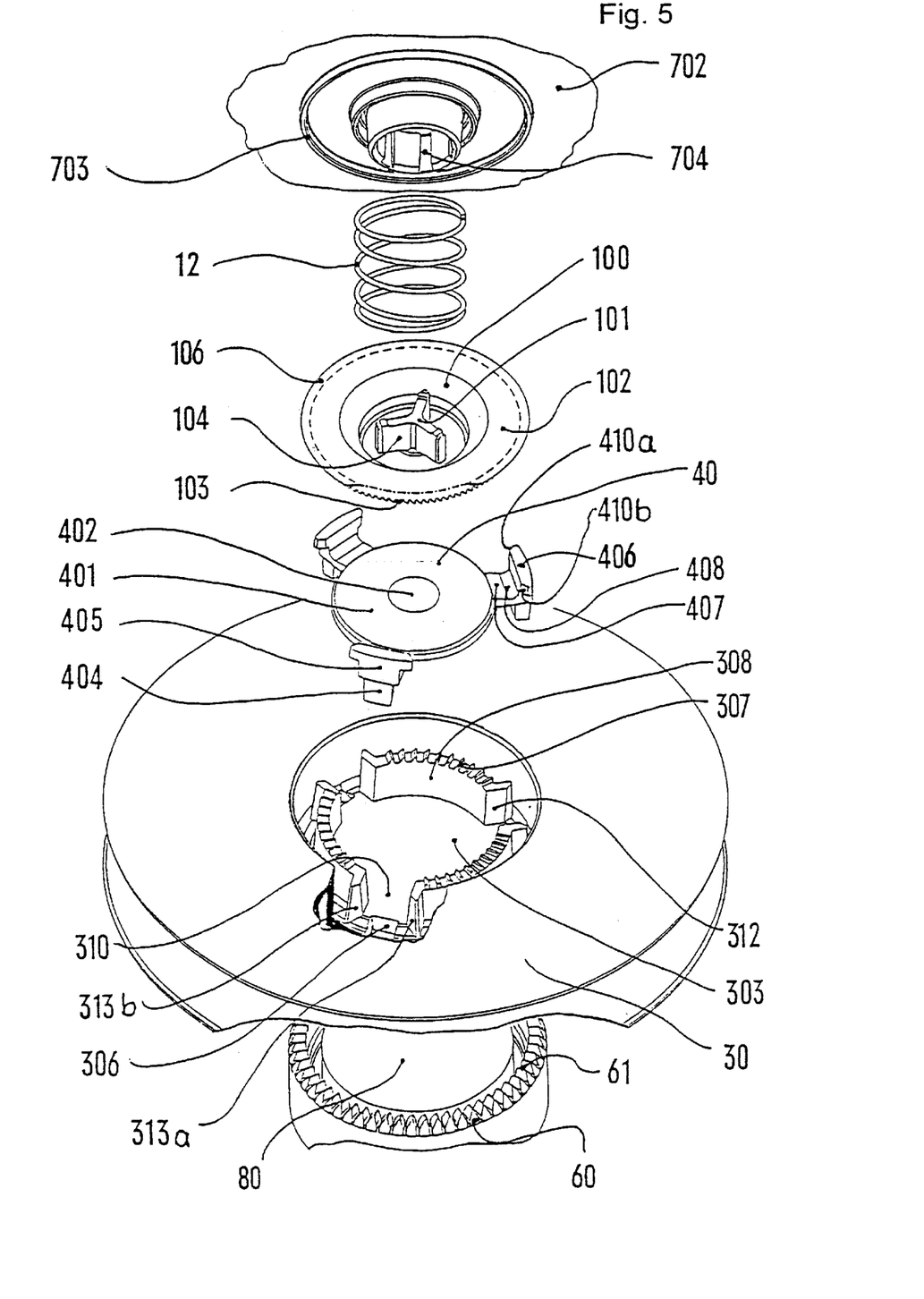
FIG. 5 shows an exploded representation of the braking system according to the invention.

The braking system according to the invention is shown in FIG. 4 in cross section and in FIG. 5 in an exploded representation. For the sake of clarity, in FIG. 4 the first and second positions of the tape reel are represented in one illustration. The left-hand part of FIG. 1 shows a cross section through the magnetic-tape cartridge with the tape reel in a rest position, and illustrates the braking serration 307 being in engagement with the braking serration 103 of the reel brake 100. The right-hand part of FIG. 1 shows a cross section through the magnetic-tape cartridge with a tape reel 30 in the operating position, and illustrates the braking serration 307 being released from the braking serration 103 of the reel brake 100.

The tape reel substantially comprises two interconnected parts, the winding plate 301 with hub 302 and hub base 303, into which a metal disk 10 is recessed, and the flange 304. A data medium, preferably a recording medium in tape form, is wound up (not shown) on the hub 302. The side of the hub base 303 facing the lower housing part 701, and consequently the driving hub or the winding pin 80, has the driving serration 305, while the braking serration 307 is provided on a substantially annular web 308 of the side of the hub base 303 facing the upper housing part 702. The hub base 303 has within the region of the driving serration 305, at least three clearances 306, through which the T-shaped feet 404 of the driver disk 40 protrude. Also provided, at the same spacing and in line with these clearances 306, in the annular web 308 are clearances 310 (see FIG. 5) which reach from the upper edge of the braking serration 307 to the upper side of the hub base 303. These clearances 310 have guiding mechanisms or surfaces 313a and 313b, which are designed in such a way that, they are in interaction with the T-shaped feet 404 of the driver disk 40. In this way, they ensure, at least in the operating position, the freedom from radial and tangential backlash of the driver disk 40 within the tape reel 30.

The reel brake 100 substantially comprises a hub 101 whose face 105 lying opposite the driver disk 40 is planar, at least in the region of the contact surface 402 of the driver disk 40. Th hub 101 has an adjoining, multiply offset flange 102, the lower end face of which likewise has a braking serration 103. The hub 101 of the reel brake 100 is mounted in a torsionally secure and axially displaceable manner by way of evenly arranged radial ribs 104 which are guided in corresponding guides 704 of the upper housing part 702. The reel brake 100 itself is supported by way of the prestressing of the spring 12 on the upper housing part 702 and is consequently pressed against the driver disk 40.

In the rest position of the tape reel 30, the lower edge of the T-shaped feet 404 of the driver disk 40, which protrudes through the hub base 303, is flush with the plane formed by the tooth heads of the driving serration 305. The driver disk 40 rests at least partially on the hub base 303 of the tape reel 30 and the reel brake 100 is pressed by way of the spring 12 against the driver disk 40, so that the braking serration 103 of the reel brake 100 and the braking serration 307 of the tape reel 30 are in engagement with one another and the tape reel 30 is consequently secured against rotational movement. In this case, as shown in FIG. 5, the number of teeth of the braking serration 103 of the reel brake 100 may be an integral multiple greater than the number of teeth of the braking serration 307 of the tape reel 30, with the same spacing, for simplified production, i.e., so that it may be produced in a simple way.

To reach the operating position of the tape reel 30, the driving hub 80 of the equipment is moved out. When this takes place, initially the driving serration 60 of the driving hub 80 and the driving serration 305 of the tape reel 30 engage in one another. The T-shaped feet 404 of the driver disk 40, which protrude through in the region of the clearances 306 in the hub base 303 of the tape reel 30, are lifted by the tooth heads 61 of the driving serration 60 of the driving hub 80 and the driver disk 40 pushes the reel brake 100 against the resistance of the spring 12 in the direction of the upper housing part 702, so that the braking serration 103 of the reel brake 100 and the braking serration 307 of the tape reel 30 come out of engagement and the tape reel 30 is from then on freely rotational. The tape reel 30 is fixed in its operating position by the effect of the force between the magnet 9 on the equipment side and the metal plate 10 recessed into the hub base 303 of the tape reel 30.

Figure 6:
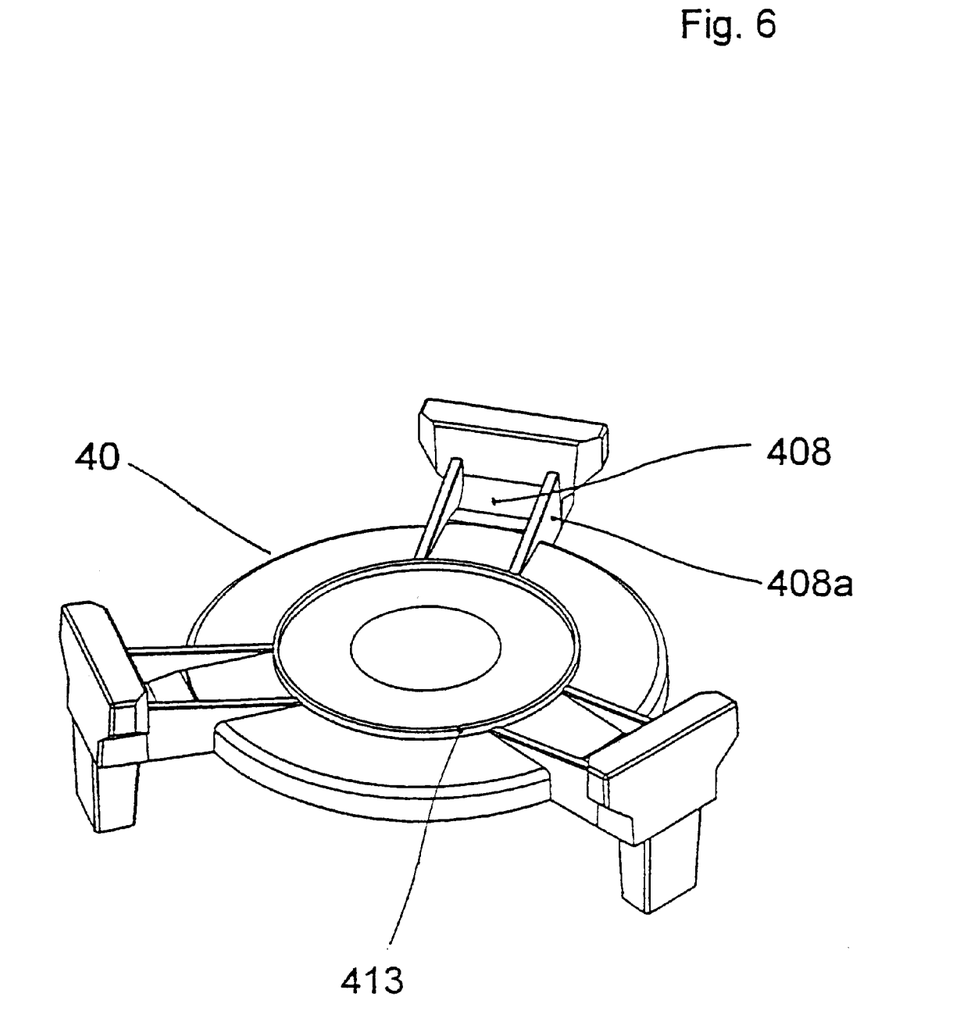
FIG. 6 shows an isometric representation of a driver disk according to the invention.

The driver disk 40 substantially comprises a circular central plate 401, the cross section of which is, for reinforcing reasons, preferably of a conical design and the upper side of the plate 401 is rounded off in the central region, which forms the contact surface 402 with respect to the reel brake 100, while the underside of the plate 401 has, preferably in the central region of the central plate 401, an elevation 403, which defines, with respect to the hub base 303, the vertical bearing contact caused by the attraction between the magnet 9 on the equipment side and the driver disk 10 recessed into the hub base 303 of the tape reel 30. In addition, as shown in FIG. 6, an annular elevation 413 is attached to the upper side of the plate 401, which prevents undesired tilting motions of the reel brake 100 relative to the driver disk 40. Evenly distributed over the circumference of the central plate 401 are a plurality of, preferably three, T-shaped feet 404, extending in the axial direction and comprising a web 405 and T-bar 406, which feet are connected to the central plate 401 by way of radial connecting elements 407, which preferably act and/or are arranged in the center of the feet 404. The width of the web 405 is somewhat less than the width of the corresponding clearance 310 in the annular web 308 of the tape reel 30, while the width of the T-bar 406 is greater than the web width 405. The T-bars 406 of the feet 404 of the driver disk 40 are designed such that they have planar guiding mechanisms or surfaces 410a and 410b, which preferably at the ends run in opposite senses with respect to one another, preferably angled obliquely toward the center axis, and are guided in a sliding manner on correspondingly beveled guiding mechanisms or surfaces 313a and 313b of the tape reel 30. The connecting elements 407 are designed such that they have at the transition to the T-shaped feet 404 of the driver disk 40 a cross-sectional reduction 408, which reduces the flexural rigidity of the connecting element 407 in a specific manner. The embodiment of the cross-sectional reduction 408 depends on the modulus of elasticity of the material used for the driver disk 40. When using materials with a low modulus of elasticity, under certain circumstances it can be necessary to apply stiffeners 408a (See FIG. 6) in order to prevent the connecting elements 407 being too pliable.

As already mentioned, the braking serration 307 of the tape reel 30 is provided on a substantially annular web 308, which lies on the side of the hub base 303 facing the upper housing part 702. Dependent on the number of feet 404 of the driver disk 40, this substantially annular web 308 is subdivided by clearances 310, through which the connecting elements 407 move or protrude, into preferably three segments. The width of these clearances 310 is chosen such that the connecting elements 407 are at a sufficient distance from the extreme end faces 312 of the segments.

The extreme end faces 312 of the individual segments of annular web 308 are lengthened radially outwardly and are designed as planar guiding mechanisms or surfaces 313a and 313b which stand perpendicularly on the hub base 303, preferably at the ends run in opposite senses with respect to one another and preferably are angled obliquely toward the center axis and correspond to the corresponding guiding mechanisms 401a and 401b of the feet 404 of the driver disk 40.

Instead of the planar contact of the guiding mechanisms or surfaces 313a, 313b, 401a and 401b, other types of contact, such as point contact for example, may also be chosen or utilized.

The function of the driver disk 40 will now be described in detail with reference to the illustrations in FIGS. 4 and 5.

If the magnetic-tape cartridge is in the rest position, i.e. the driving hub 80 of the equipment has not been moved out, the tape reel 30 is in its first position (i.e., as shown on the left side of FIG. 1). As can be seen from the left-hand part of the illustration in FIG. 4, the driver disk 40 rests with its elevation 403 and the connecting elements 407 at least partially on the hub base 303. In this rest position, when no external forces are acting on the cartridge, the gap between the guiding mechanisms or surfaces 401a and 401b of the feet 404 of the driver disk 40 and the guiding mechanisms or surfaces 310a and 310b of the tape reel 30, such mechanisms being in the form of faces, is preferably >0.1 mm. If the driving hub 80 of the equipment is then moved out, until the magnet 9 on the equipment side and the metal plate 10 recessed into the hub base 303 of the tape reel 30 attract one another, the tooth tips 61 of the driving serration 60 initially touch the feet 404 of the driver disk 40. With increasing travel of the driving hub 80, the feet 404 of the driver disk 40 are pressed in the direction of the upper housing part 702 and the driver disk 40 pushes the reel brake 100 against the resistance of the spring 12 in the direction of the upper housing part 702, so that the braking serration 103 of the reel brake 100 and the braking serration 307 of the tape reel 30 come out of engagement and the tape reel 30 is from then on freely rotatable. The spring force, which is constantly increasing during this operation and is distributed from the center of the driver disk 40 via the central plate 401 and the connecting elements 407 to the feet 404, has the effect of exerting on the connecting elements 407 a bending moment, which makes the feet 404 of the driver disk 40 tilt in the direction of the center of the driver disk 40 on account of the cross-sectional reduction 408, so that the guiding mechanisms or surfaces 410a and 410b of the upper T-bar 406 of the feet 404 of the driver disk 40 and the corresponding guiding mechanisms or surfaces 313a and 313b of the tape reel 30 come into bearing contact with one another, whereby a freedom from radial and tangential backlash of the driver disk 40 in the tape reel 30 is ensured.

Within the scope of the invention it is also possible for the guiding mechanisms or surfaces 410a and 410b of the driver disk 40 and the guiding mechanisms or surfaces 313a and 313b of the tape reel 30 to come into mutual bearing contact already in the rest position, with a certain prestressing of the feet 404 of the driver disk 40. This prestressing is then increased by the previously described operation when the driving hub 80 moves into the operating position.

In any event, the sum of the frictional forces, caused by the flexible fixing, between the guiding mechanisms or surfaces 313a, 313b, and 410a, 410b of the braking parts 40 and 100, the ribs 104 and the guides 704, the flexible spring element 106 and the peripheral housing rib 703 of the braking part 100 and upper housing part 702, as well as between the contact surfaces 105, 402 of the braking part 100 and driver disk 40 must be less than the minimum force of the spring 12 acting on the braking part 100.

Therefore, and to avoid rotational friction and/or wear between the reel brake 100 and driver disk 40, it is advantageous that the reel brake 100 and/or the driver disk 40 comprise a wear-resistant plastic, such as for example nylon 6.6 or POM, at least the wear-resistant plastic of one part being mixed with at least one friction-reducing additive, such as for example molybdenum disulfide, Teflon and/or other lubricants.

A further advantage of the invention is attributable to the special configuration of the contact surfaces 105, 402 of the reel brake 100 and driver disk 40. As already described above, the face 105 of the reel brake 100 lying opposite the driver disk 40 is of a planar configuration, at least in the region of the contact surface 402 of the driver disk 40, whereas the contact surface 402 of the driver disk 40 is rounded off. This has the consequence that, when there is wear of the contact surfaces 105, 402, the reel brake 100 orients itself on the driver disk 40, which experience shows always centers itself in the tape reel 30, especially since the radial moveability of the reel brake 100 in the guide can be kept correspondingly great. Consequently, smooth running of the tape reel 30 is ensured.

The tendency of the reel brake 100 to undergo wobbling movements is counteracted by the fact that there are preferably arranged on the upper outer edge of the reel brake 100 regularly distributed or continuous, thin-walled flexible elements 106, which in the upper end position of the reel brake 100 come to bear against a preferably peripheral rib 703 of the upper housing part 702.

We claim:

1. A magnetic-tape cartridge comprising:

a substantially rectangular housing;

at least one tape reel rotatably mounted in the housing;

the at least one tape reel being configured to receive wound magnetic tape;

a first part being axially movably mounted in a center of the at least one tape reel;

a second part non-rotatably mounted and axially movably mounted to a housing wall of the cartridge via a spring;

the first part being movable between a resting position and an operating position in which the first part moves the second part against the biasing force of the spring; and the second part being movable between a first position, thereby preventing the at least one tape reel from rotating, to a second position thereby allowing rotation of the at least one tape reel, wherein each of the first and second parts is movably disposed in the housing, wherein the second part comprises a reel brake and a contact surface, and wherein the reel brake comprises at least one thin-walled flexible element.

2. The magnetic-tape cartridge of claim 1, wherein the at least one thin-walled flexible element is engagable with a peripheral rib projecting from the housing wall of the cartridge.

3. A magnetic-tape cartridge comprising:

a substantially rectangular housing;

at least one tape reel rotatably mounted in the housing;

the at least one tape reel being configured to receive wound magnetic tape;

a first part being axially movably mounted in a center of the at least one tape reel;

a second part non-rotatably mounted and axially movably mounted to a housing wall of the cartridge via a spring;

the first part being movable between a resting position and an operating position in which the first part moves the second part against the biasing force of the spring; and the second part being movable between a first position, thereby preventing the at least one tape reel from rotating, to a second position thereby allowing rotation of the at least one tape reel, wherein each of the first and second parts is movably disposed in the housing, wherein the first part comprises a driver disk that includes a circular central plate and a contact surface, and wherein the driver disk includes a plurality of feet which are evenly distributed over a circumference of the circular central plate, wherein the feet extend in an axial direction and are T-shaped.

4. The magnetic-tape cartridge of claim 3, wherein the feet are connected centrally to the circular central plate by radial connecting elements.

5. The magnetic-tape cartridge of claim in claim 4, wherein the radial connecting elements comprise a cross-sectional reduction.

6. The magnetic-tape cartridge of claim 3, wherein the feet comprise T-bars.

7. The magnetic-tape cartridge of claim 6, wherein the T-bars comprise one of planar guiding mechanisms and planar guiding surfaces.

8. The magnetic-tape cartridge of claim 7, wherein the planar guiding mechanisms or surfaces are angled obliquely toward a center axis.

9. The magnetic-tape cartridge of claim 8, wherein the at least one tape reel comprises one of planar guiding mechanisms and planar guiding surfaces which engage the T-bars.

* * * * *